(No Model.)
C. C. DEWITT.
REVERSING GEAR.
No. 600,411. Patented Mar. 8, 1898.
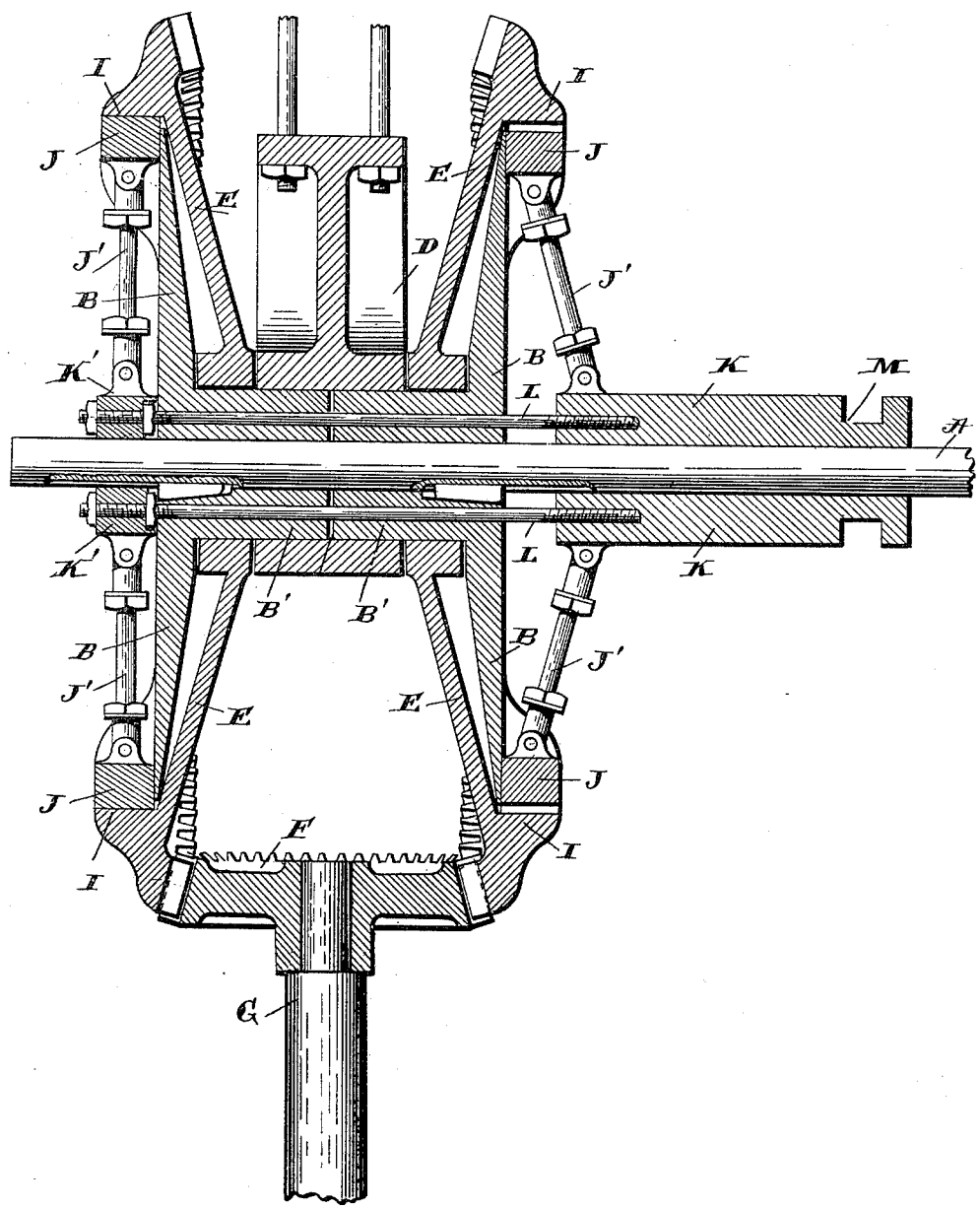

UNITED STATES PATENT OFFICE.

CARL C. DEWITT, OF WATERLOO, IOWA.

REVERSING-GEAR.

SPECIFICATION forming part of Letters Patent No. 600,411, dated March 8, 1898.

Application filed August 7, 1897. Serial No. 647,466. (No model.)

*To all whom it may concern:*

Be it known that I, CARL C. DEWITT, of Waterloo, in the county of Black Hawk and State of Iowa, have invented certain new and useful Improvements in Reversing-Gears; and I do hereby declare the following to be a full, clear, and exact description of the invention, such as will enable others skilled in the art to which it pertains to make and use it, reference being had to the accompanying drawing, which forms part of this specification.

This invention relates to a reversing-gear of simple and improved construction.

The object of the invention is to provide a gearing especially adapted for connecting explosive and other engines which propel in one direction only, and while the primary use for which I have designed this improvement is in connection with gasolene traction-engines its usefulness is not limited thereto, but may be used with any machine-gearing where a quick and positive reverse is required.

The invention consists in the novel features of construction hereinafter fully described and claimed, and illustrated by the accompanying drawing, which is a sectional view of the gearing.

A designates the power-shaft, and B B two oppositely-facing spiders keyed to the shaft. The spider-hubs B' are mounted in bracket D, which constitutes a bearing for the gearing. The bracket is narrower in cross-section than the combined length of the spider-hubs, and mounted loosely upon the latter and between the bracket and the spiders proper are the oppositely-facing beveled gears E. The gears mesh with opposite sides of gear F on the engine-shaft G.

Gears E are formed with circular flanges I, which overhang the spiders and which are adapted to be engaged by friction-shoes J, pivotally mounted on the outer ends of links J', the inner ends of the links being pivotally secured to collars K and K', which are moved longitudinally on shaft A. These collars are positively connected by rods or bolts L, extending through holes bored longitudinally through the spiders. Sleeve K is longer than sleeve K' and is grooved, as indicated at M, to receive a reversing-lever, (not shown,) which may be of any preferred construction.

As sleeves K and K' are keyed to turn with shaft A, a longitudinal movement of the sleeve engages one of the clutches with one or the other of the gears and makes the latter rigid with the power-shaft, the other gear revolving loosely as an idler. The mechanism is extremely simple and provides an instantaneous reverse for the power-shaft.

Having thus fully described my invention, what I claim as new, and desire to secure by Letters Patent, is—

1. An improved reversing mechanism comprising a power-shaft, two oppositely-facing spiders secured thereto and having elongated inwardly-extending hubs, a bracket between the spiders in which their hubs are rotatably mounted, oppositely-facing gears loosely mounted upon the spider-hubs between opposite sides of the bracket and the spiders proper, clutches rotatable with the shaft and adapted to alternately engage the gears, clutch-actuating mechanism, and an actuating-gear, substantially as shown and described.

2. An improved reversing mechanism comprising a power-shaft, spiders revoluble therewith, oppositely-facing gears loosely mounted on the spiders, two sleeves on opposite sides of the spiders movable longitudinally on the power-shaft but adapted to rotate therewith, bolts extending through the spiders and rigidly connecting the sleeves, clutch-shoes adapted to engage the oppositely-facing gears, links connecting the shoes with the sleeves, and a power-gear arranged between the oppositely-facing gears, substantially as shown and described.

3. An improved clutch mechanism, comprising a power-shaft, spiders keyed to the shaft and formed with longitudinally-bored inwardly-extending hubs, oppositely-facing gears E loose on the hubs, a clutch mechanism on the outer side of each gear and rotatable with and movable longitudinally on the shaft, and rods extending through the spider-hub bores and uniting the clutch mechanisms so that when one clutch is in engagement with its gear the other clutch is disengaged from the other gear, substantially as shown and described.

In testimony whereof I affix my signature in presence of two witnesses.

CARL C. DEWITT.

Witnesses:
JOHN C. SCOTT,
GEORGE H. WILSON.